(12) United States Patent
Derrick et al.

(10) Patent No.: US 6,588,794 B1
(45) Date of Patent: Jul. 8, 2003

(54) METHOD FOR MANUFACTURING A COVER CAP FOR A GAS BAG RESTRAINT MODULE AND COVER CAP

(75) Inventors: John-Oliver Derrick, Hettstadt (DE); Udo Bieber, Niedernberg (DE); Ralph Neupert, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/699,169

(22) Filed: Oct. 27, 2000

(30) Foreign Application Priority Data

Oct. 29, 1999 (DE) .......................................... 199 52 497

(51) Int. Cl.$^7$ ................................................ B60R 21/20
(52) U.S. Cl. ..................................... 280/728.3; 280/732
(58) Field of Search ............................... 280/728.3, 732, 280/743.1, 731; 264/446, 447, 345, 232, 234, 402, 405, 482, 492, 603

(56) References Cited

U.S. PATENT DOCUMENTS

| | | | | |
|---|---|---|---|---|
| 4,995,638 A | * | 2/1991 | Shinto et al. ................ 280/731 |
| 5,096,220 A | * | 3/1992 | Nakajima .................. 280/728.3 |
| 5,143,401 A | * | 9/1992 | Zushi ......................... 280/731 |
| 5,217,244 A | * | 6/1993 | Bauer ....................... 280/728.3 |
| 5,320,380 A | * | 6/1994 | Hamada et al. ........... 280/728.3 |
| 5,358,986 A | * | 10/1994 | Onofusa et al. ............. 524/284 |
| 5,372,379 A | | 12/1994 | Parker |
| 5,611,564 A | * | 3/1997 | Bauer ....................... 280/728.3 |
| 5,744,776 A | * | 4/1998 | Bauer ....................... 219/121.7 |
| 5,883,356 A | * | 3/1999 | Bauer et al. ............ 219/121.62 |
| 5,979,931 A | * | 11/1999 | Totani et al. ............. 280/728.3 |
| 6,062,590 A | * | 5/2000 | Gallagher ................. 280/728.1 |
| 6,070,901 A | * | 6/2000 | Hazell et al. ............. 280/728.3 |
| 6,113,131 A | * | 9/2000 | Uehara et al. ............ 280/728.3 |

FOREIGN PATENT DOCUMENTS

| | | |
|---|---|---|
| DE | 29609801 | 10/1996 |
| EP | 0639481 | 2/1995 |
| JP | 10095297 | 4/1998 |
| WO | 9717233 | 5/1997 |

* cited by examiner

Primary Examiner—Paul N. Dickson
Assistant Examiner—David R. Dunn
(74) Attorney, Agent, or Firm—Tarolli, Sundheim, Covell & Tummino L.L.P.

(57) ABSTRACT

A method for manufacturing a cover cap for a gas bag restraint module, which cover cap tears open for deployment of a gas bag, contains the step of treating the cap at least region-wise physically and/or chemically such that its material in a treated region has a lower strength than in an untreated state. The treated region is a predetermined tear-open region for allowing the gas bag to unfold. A cover cap made of plastic for a gas bag restraint module has a predetermined tear region. The cap has a higher brittleness at said tear region than in a remainder of said cap.

13 Claims, 2 Drawing Sheets

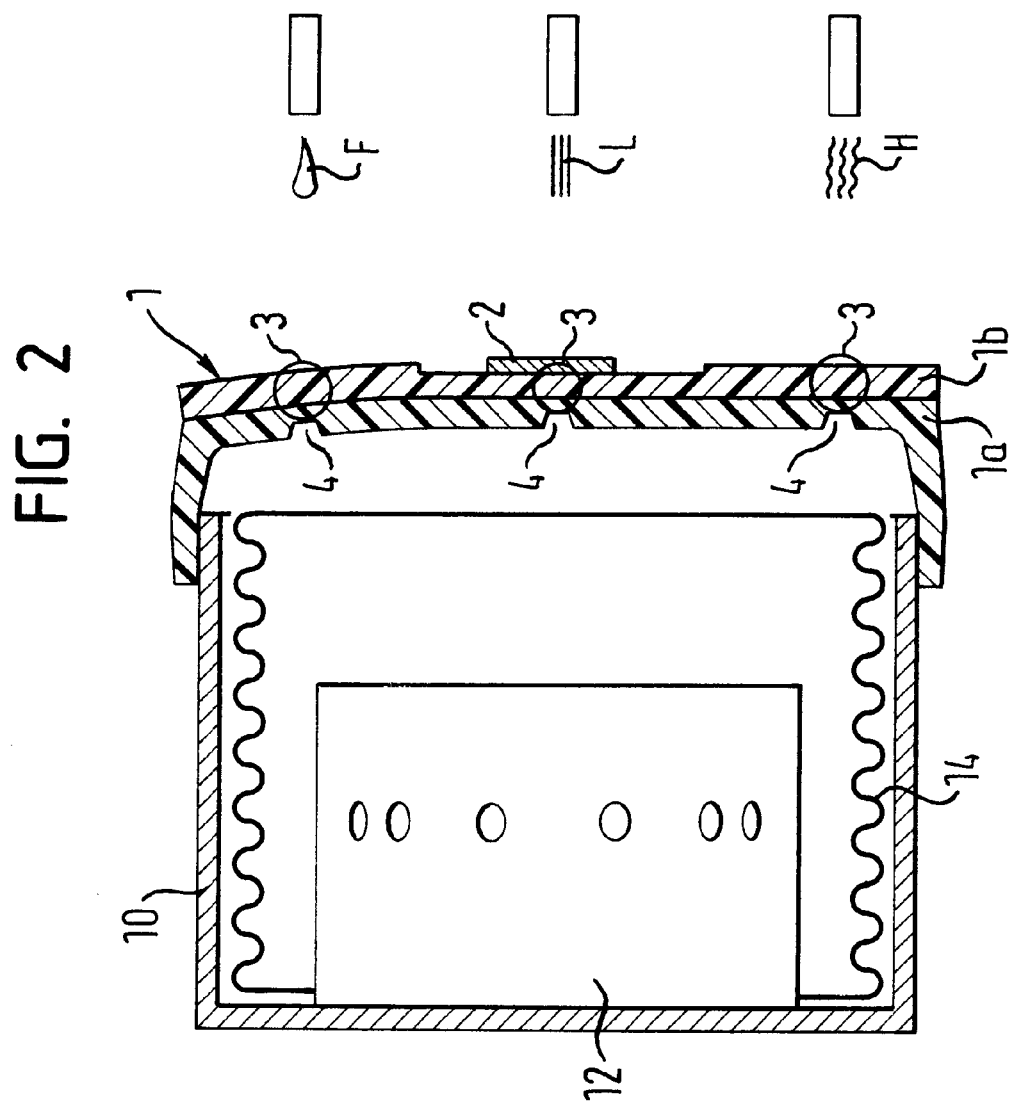

METHOD FOR MANUFACTURING A COVER CAP FOR A GAS BAG RESTRAINT MODULE AND COVER CAP

TECHNICAL FIELD

The invention relates to a method for manufacturing a cover cap for a gas bag restraint module and to a cover cap, preferably made of plastic, for a gas bag restraint module.

BACKGROUND OF THE INVENTION

The tear lines on cover caps, which are usually made of plastic, are intended to permit the cover cap to tear open in a defined manner at all times over a wide temperature range.

Tear lines, or so-called initial points, from which the tearing process initiates, are formed in the cap by depressions in the plastic. Particularly at very low temperatures, it is very hard to ensure that the cap tears open within a close tolerance range of the force applied to it. Furthermore, the depressions are marked in the cover cap on the front side which is not desired. Moreover, due to the depressions, the elasticity of the region encompassed by the tear line is reduced, which is also to be avoided.

BRIEF SUMMARY OF THE INVENTION

The invention provides a method that reduces the above disadvantages.

The invention provides a method for manufacturing a cover cap for a gas bag restraint module, which cover cap tears open for deployment of a gas bag. The method contains the step of treating the cap at least region-wise physically and/or chemically such that its material in a treated region has a lower strength than in an untreated state. The treated region is a predetermined tear or tear-open region for allowing the gas bag to unfold.

The method according to the invention provides for the cover cap being weakened at least region-wise by chemical and/or physical treatment in such a way that this region can tear open more easily. This is achieved by amending the material of the cap itself and its stability, i.e. not by amending the geometry of the cap through e.g. providing indentations. Depressions can thus possibly be omitted or be of lesser depth than was previously the case. Furthermore, the force needed for tearing open can be predetermined over the entire temperature range (−40° C. to +80°C.) within tight limits.

The invention further comprises a cover cap made of plastic for a gas bag restraint module which cap has a predetermined tear region. The cap has a higher brittleness at said tear region than in a remainder of said cap.

BRIEF DESCRIPTION OF THE DRAWINGS

FIG. 2 shows a scaled-down sectional view along the line II—II through the cover cap according to the invention as shown in FIG. 1.

DETAILED DESCRIPTION OF THE PREFERRED EMBODIMENT

Figure 1:
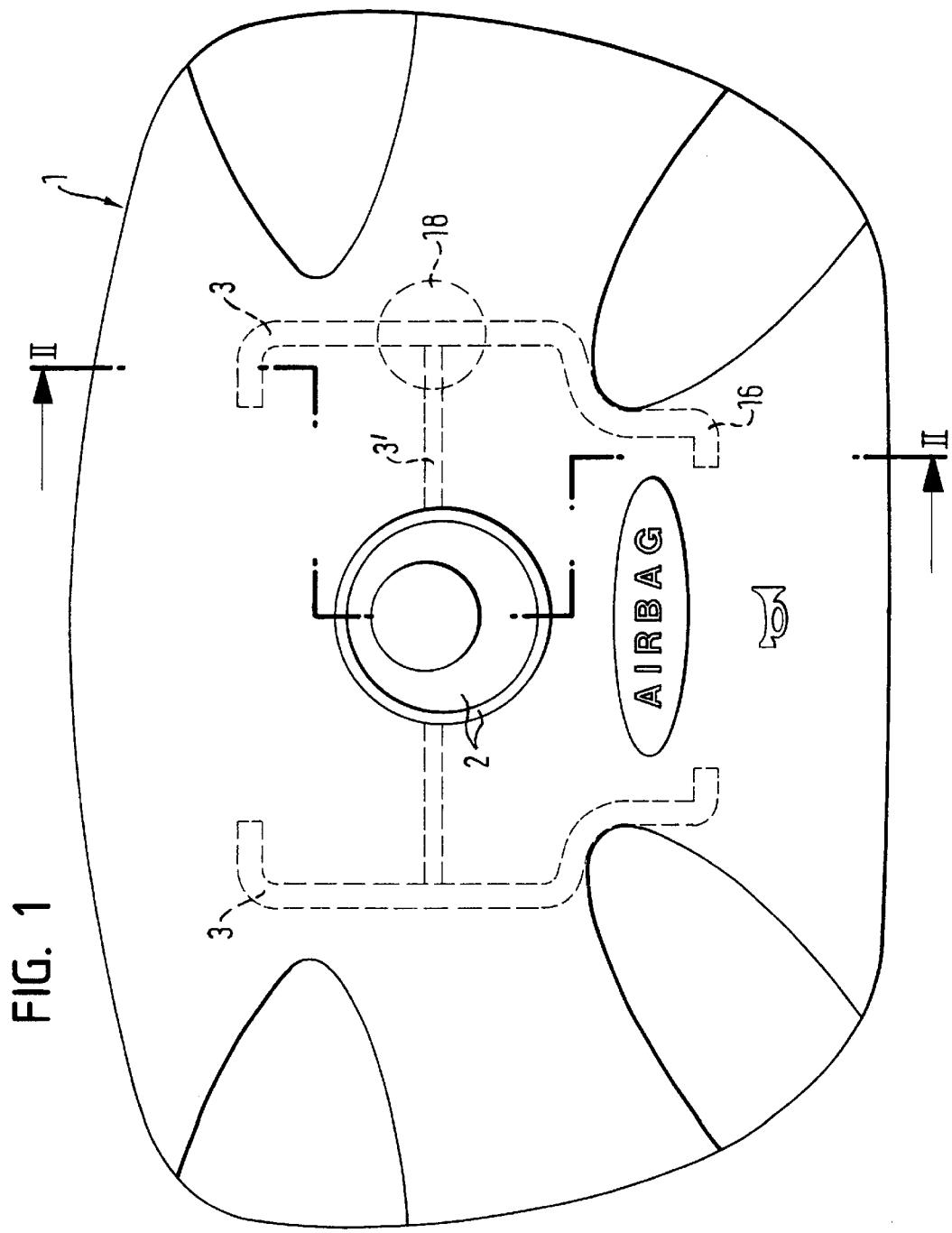
FIG. 1 shows a top view on an embodiment of the cover cap manufactured according to the invention.

FIG. 1 shows a cover cap 1 for a driver gas bag restraint module fitted to the steering wheel. The module comprises a container 10, an inflator 12, a gas bag 14 and the cover cap 1 which closes the container 10. Under the cover cap, the gas bag is provided which in a restraint situation destroys the cap along a tear line 3, 3' indicated by dashed lines. The tear line defines a tear region. An emblem attached on the outside has the designation 2. The cover cap consists of two components 1a and 1b (see FIG. 2); the carrier component 1a is U-shaped in a section view, and the component 1b covers the entire outside cover region that can be seen in FIG. 1. Both components are made of plastic.

The tear line 3, 3' is produced by physical and/or chemical treatment of the component 1a and/or component 1b. For instance, a liquid F is applied to the plastic along the tear region, i.e. along the tear line 3, 3' and embrittles it section-wise. Physical treatment with light L and/or heat H can also lead to embrittlement. In the embrittled region, the plastic has a lower strength than in the untreated, i.e. non-embrittled, state and in the remainder of the cap, i.e. the regions not embrittled.

If the embrittlement alone is not enough to ensure a low tearing force, a small depression 4, which must not necessarily extend along the entire tear line 3, can also be provided as shown in FIG. 2. Furthermore, it should be explained that the embrittlement itself cannot be seen on the material, and therefore the embrittled region is only outlined in FIG. 2; from the purely visual aspect, however, there is no difference compared with the region that was not treated.

On the outside, however, the cover cap is not made with a depression, not even in the region of the tear line 3.

Nor need the tear line 3 be embrittled over the entire length by physical and/or chemical treatment; section-wise embrittlement is also conceivable. Furthermore, for example, the central tear line 3', which tears first, can be treated more intensively than the remaining tear line 3, such that its strength remains considerably below that of the cover cap in the region of the tear line 3.

It is also conceivable to embrittle the entire front cover region, i.e. the front side or the outside of the cover cap or the entire cover cap and to provide it preferably with the depressions 4 on the rear side in order to make it easier for cap to be opened.

Furthermore it is possible, for example, to not embrittle the tear line 3, only the central tear line 3'.

Also, an embrittlement solely in the region of an edge 16 (tear edge) or of a wide-area region, e.g. the region 18, is possible in order to form a predetermined breaking point.

What is claimed is:

1. A method for manufacturing a cover cap for a gas bag restraint module, which cover cap tears open for deployment of a gas bag, said method comprising the steps of:

providing said cover cap with a section of a material of a predetermined thickness;

physically treating said section of said material of said cover cap with one of light and heat to cause said material in said section after said physically treating to have a lower strength than said material in an untreated section, and said thickness of said material of said section being unchanged before and after said physically treating, said treating step of said section of said material including treating said section in different regions with different intensity to cause the resulting lower strength of the material of said.section to differ in said different regions.

2. The method according to claim 1 wherein said treating in different regions forms at least two tear lines with differing tearing strengths.

3. The method according to claim 1 wherein said cover cap is made of plastic.

4. The method according to claim 3 wherein said treating of the plastic embrittles said section in at least one of said different regions.

5. The method according to claim 1 wherein said cover cap has a predetermined tear region and said treating is at said predetermined tear region.

6. The method according to claim 5 wherein the predetermined tear region is a predetermined tear line.

7. The method according to claim 5 wherein said method includes the step of at least partially reducing the thickness in said section to be treated prior to the physical treating.

8. The method according to claim 6 wherein said method includes the step of at least partially reducing the thickness along said section to be treated along said tear line prior to the physical treating.

9. The method according to claim 1 wherein said cover cap has a front side region and said method includes treating said front side region entirely.

10. A method for manufacturing a cover cap for a gas bag restraint module, which cover cap tears open for deployment of a gas bag, said method comprising the steps of:

providing said cover cap made at least in part of plastic material;

treating chemically a section of said plastic material to cause said section after said chemically treating to have a lower strength than the strength of said plastic material in an untreated section, said treating step including treating said section in different regions with different intensity to cause the resulting strength of said material of said section to differ in said different regions.

11. The method according to claim 10 wherein said material of said section prior to being treated chemically has a predetermined thickness, and said thickness of said material of said section being unchanged after said chemically treating.

12. A cover cap made of plastic material for a gas bag restraint module, said cover cap comprising at least two predetermined tear regions, said material in said two tear regions having a higher brittleness than said material in a remainder of said cap and said material differing in brittleness in said two tear regions.

13. The cover cap according to claim 12 wherein said cover has an outside and wherein said cap has no depression on said outside in said two predetermined tear regions.

* * * * *